(12) United States Patent
Chen et al.

(10) Patent No.: US 12,486,383 B1
(45) Date of Patent: Dec. 2, 2025

(54) METHOD FOR PROMOTING SOLUBILITY OF RG-I PECTIN BASED ON POLYSACCHARIDE INTERACTION

(71) Applicant: Zhejiang University, Hangzhou (CN)

(72) Inventors: Jianle Chen, Hangzhou (CN); Shiguo Chen, Hangzhou (CN); Huan Cheng, Hangzhou (CN); Jiayun Xu, Hangzhou (CN); Xingqian Ye, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 19/250,705

(22) Filed: Jun. 26, 2025

(30) Foreign Application Priority Data

Jul. 16, 2024 (CN) .......................... 202410948269.6

(51) Int. Cl.
| | | |
|---|---|---|
| *C08L 5/06* | (2006.01) | |
| *A61K 8/73* | (2006.01) | |
| *A61K 31/732* | (2006.01) | |
| *A61K 47/36* | (2006.01) | |

(52) U.S. Cl.
CPC ................. *C08L 5/06* (2013.01); *A61K 8/73* (2013.01); *A61K 31/732* (2013.01); *A61K 47/36* (2013.01)

(58) Field of Classification Search
CPC ........... C08L 5/06; A61K 8/73; A61K 31/732; A61K 47/36
See application file for complete search history.

(56) References Cited

U.S. PATENT DOCUMENTS

| | | | |
|---|---|---|---|
| 2013/0230631 A1 | 9/2013 | Maeshima et al. | |
| 2021/0177886 A1* | 6/2021 | Albers | A61K 36/00 |

FOREIGN PATENT DOCUMENTS

| | | |
|---|---|---|
| CN | 101538371 A | 9/2009 |
| CN | 103980717 A | 8/2014 |
| CN | 105131345 A | 12/2015 |
| CN | 110558564 A | 12/2019 |
| CN | 114699385 A | 7/2022 |
| CN | 117281251 A | 12/2023 |

OTHER PUBLICATIONS

Zannini, D. et al., "Citrus Pomace Biomass as a Source of Pectin and Lignocellulose Fibers: From Waste to Upgraded Biocomposites for Mulching Applications", Polymers 2021, 13, 1280, https://doi.org/10.3390/polym13081280, pp. 1-16.*
Notification to Grant Patent Right for Invention dated Feb. 12, 2025 in SIPO application No. CN202410948269.6, 3 pages.
Retrieval report-First search dated Feb. 7, 2025 in SIPO application No. CN202410948269.6, 6 pages.
Zheng Jiaqi, "Gelling mechanism and application of citrus RG-I pectin", Chinese Master's Theses Full-text Database Engineering science and technology series I, Jan. 15, 2022, pp. B024-264, issue 01, English abstract on pp. 8-9, 89 pages.
Jiaqi Zheng et al., "Gelling mechanism of RG-I enriched citrus pectin Role of arabinose side-chains in cation- and acid-induced gelation", Food Hydrocolloids, 2019-11-22, p. 105536, vol. 101, 36 pages.
Elena A. Günter et al., "Characterization and swelling properties of composite gel microparticles based on the pectin and K-carrageenan", International Journal of Biological Macromolecules, Aug. 6, 2020, pp. 2232-2239, vol. 164.

* cited by examiner

*Primary Examiner* — Patrick D Niland
(74) *Attorney, Agent, or Firm* — Cooper Legal Group, LLC (57) ABSTRACT

A method for promoting the solubility of rhamnogalacturonan I (RG-I) pectin based on polysaccharide interaction is provided. The method includes the following steps: adding an aqueous solution of negatively charged polysaccharides to an RG-I pectin extract, mixing uniformly, adjusting the potential of Hydrogen (pH) of the compound to 3-7, performing ethanol precipitation to obtain a precipitate; washing the precipitate, followed by drying and crushing to obtain a polysaccharide-pectin compound; where the RG-I pectin extract is obtained by extracting orange peel powder with dilute hydrochloric acid.

10 Claims, 7 Drawing Sheets

METHOD FOR PROMOTING SOLUBILITY OF RG-I PECTIN BASED ON POLYSACCHARIDE INTERACTION

CROSS-REFERENCE TO RELATED APPLICATIONS

This application claims priority to Chinese Patent Application No. 202410948269.6, filed on Jul. 16, 2024, the contents of which are hereby incorporated by reference.

TECHNICAL FIELD

The disclosure relates to the field of biotechnology, in particular to a method for promoting the solubility of rhamnogalacturonan I (RG-I) pectin based on polysaccharide interaction.

BACKGROUND

Pectin is a class of anionic heteropolysaccharides widely present in the cell walls of higher plants, accounting for about 2-35 percent (%) of a cell wall composition. It is also the most abundant water-soluble dietary fiber in nature. Main structural domains of pectin include homogalacturonan (HG), rhamnogalacturonan I (RG-I), rhamnogalacturonan II (RG-II), and a small amount of substituted galacturonan. RG-I pectin is widely distributed in nature, and most terrestrial plants are rich in RG-I pectin. In recent years, RG-I pectin has attracted widespread attention due to its excellent physiological activities and significant health benefits, such as anti-cancer, anti-inflammatory, anti-obesity, antioxidant, and immune regulation effects.

A preparation process of RG-I pectin typically includes several steps: extracting, potential of Hydrogen (pH) adjusting, ethanol precipitation separating, and drying. Among these, heat treatment, due to low cost and simple operation, is an unavoidable unit operation in the drying process, such as hot air drying or spray drying. A difference between RG-I pectin and commercial pectin mainly lies in the rich side-chain structure of RG-I pectin, therefore the RG-I region is also called the 'hairy region' of a pectin chain. During a heat-drying process, RG-I pectin tends to undergo entanglement and aggregation between chains, leading to thermal aggregation and subsequent poor solubility. Currently, applications of RG-I pectin are generally based on RG-I pectin aqueous solution after dissolution, making the solubility a critical prerequisite and performance indicator for its applications.

There have been some reports on polysaccharide blending interactions, but the reports mainly focus on improving functional properties of polysaccharides, such as blending gelatin with chitosan or konjac glucomannan to impart better viscosity and stability on modified gelatin (Chinese Patent CN103980717A); blending pullulan, sodium alginate, and propylene glycol phosphate to prepare ternary polysaccharides for improving the stability under high temperature and humidity conditions (Chinese Patent CN105131345A). High-performance composite hydrogels have also been prepared, such as blending cellulose nanofibers with sodium alginate to produce composite hydrogels that combine a good flexibility of cellulose nanofibers with a biological activity of sodium alginate, thus enhancing medicine efficacy (Chinese Patent CN114699385A); blending alginate with konjac glucomannan to prepare W/O/W double-network emulsion gels, which may be used as fat substitutes due to surfactant-free properties and better stability (Chinese Patent CN117281251A). High-performance degradable composite films have also been developed, such as blending chitosan, β-cyclodextrin, and sodium benzoate to improve the functional properties of composite films and reduce production costs (Chinese Patent CN101538371). Current blending technologies are generally applied to enhance the functional properties of the polysaccharides, and there have been no reports on the use of blending technology for the purpose of improving product solubility during preparation.

SUMMARY

The objective of the disclosure is to provide a method for promoting the solubility of RG-I pectin based on polysaccharide interaction, addressing the problems (poor solubility caused by thermal aggregation) in the existing technology. The disclosure utilizes a co-mixing of negatively charged polysaccharides with RG-I pectin before heat-drying treatment to enhance an anti-aggregation capability of an entire system, thereby achieving a purpose of promoting the solubility of heat-dried RG-I pectin, and has good industrial application prospects.

To achieve the above objective, the disclosure provides the following schemes:

The disclosure provides a method for promoting the solubility of RG-I pectin based on polysaccharide interaction, including the following steps:
- adding an aqueous solution of negatively charged polysaccharides into an RG-I pectin extract, mixing uniformly, adjusting the pH of a compound to 3-7, and then performing ethanol precipitation to obtain precipitates;
- washing the precipitates, followed by drying and crushing to obtain a polysaccharide-pectin compound; and
- the RG-I pectin extract is obtained by extracting an orange peel powder with dilute hydrochloric acid.

In an embodiment, the pH of the dilute hydrochloric acid is 1-3.

In an embodiment, a mass ratio of RG-I pectin in the RG-I pectin extract to the negatively charged polysaccharides is 1:1.

In an embodiment, the negatively charged polysaccharides are HG pectin, κ-carrageenan, or ι-carrageenan.

In an embodiment, the negatively charged polysaccharides are ι-carrageenan.

In an embodiment, a mass ratio of the orange peel powder to the dilute hydrochloric acid is 1:10-20.

In an embodiment, in the aqueous solution of negatively charged polysaccharides, a mass-to-volume ratio of solute to solvent is 0.5-5:100.

In an embodiment, steps of adding the aqueous solution of negatively charged polysaccharides into the RG-I pectin extract includes: first adding 40-60% of the aqueous solution of negatively charged polysaccharides dropwise to the RG-I pectin extract while stirring continuously to achieve thorough pre-mixing, and after uniform mixing, adding a remaining aqueous solution of negatively charged polysaccharides and stirring uniformly.

In an embodiment, the ethanol precipitation is performed using anhydrous ethanol, and a volume of anhydrous ethanol added is 3-5 times of a volume of the compound.

The disclosure also provides a polysaccharide-pectin compound prepared by the above methods.

The disclosure discloses the following technical effects.

The research of the disclosure finds the presence of neutral sugar side chains in RG-I pectin results in insufficient charge on pectin chains, leading to weak intermolecular electrostatic repulsion, consequently, during heat-drying, the RG-I pectin chains tend to entangle and aggregate, causing thermal aggregation, further leading to poor solubility. Based on this discovery, the disclosure utilizes other polysaccharides with different charge properties to co-mix with RG-I pectin before heat-drying treatment, enhancing the anti-aggregation capability of the entire system and thereby achieving the purpose of promoting the solubility of heat-dried RG-I pectin, holding promising industrial application prospects.

BRIEF DESCRIPTION OF THE DRAWINGS

To more clearly illustrate technical schemes in embodiments of the disclosure or prior art, a following briefly introduces attached drawings required for describing the embodiments. Obviously, the attached drawings in a following description show only some embodiments of the disclosure, and those of ordinary skill in the art may derive other drawings from these attached drawings without creative efforts.

DETAILED DESCRIPTION OF THE EMBODIMENTS

Various exemplary embodiments of the disclosure are described in detail below. This detailed description should not be construed as limiting the disclosure but rather as providing a more detailed description of certain aspects, features, and embodiments of the disclosure.

It should be understood that the terminology used in the disclosure is only for describing specific embodiments and is not intended to limit the disclosure. In addition, for numerical ranges in the disclosure, it should be understood that each intermediate value between upper and lower limits of the range is also specifically disclosed. Any stated value or intermediate value within a stated range, and any smaller range between any other stated value or intermediate value within the stated range, is also included in the disclosure. The upper and lower limits of these smaller ranges may be independently included or excluded from the range.

Unless otherwise specified, all technical and scientific terms used herein have the same meanings as commonly understood by those skilled in the art to which the disclosure belongs. Although the disclosure describes only preferred methods and materials, any methods and materials similar or equivalent to those described herein may also be used in a practice or a testing of the disclosure. All documents mentioned in this specification are incorporated by reference to disclose and describe the methods and/or materials related to the documents. In case of conflict with any incorporated document, the content of this specification shall prevail.

Various modifications and changes may be made to the specific embodiments of the disclosure described herein without departing from a scope or spirit of the disclosure, which will be obvious to those skilled in the art. Other embodiments obtained from the description of the disclosure will be obvious to those skilled in the art. The description and Embodiments of the disclosure are illustrative only.

The terms "comprising," "including," "having," "containing," etc., used herein are open-ended terms, meaning including but not limited to.

Embodiment 1

Extraction of the RG-I Pectin.

Taking 10 grams (g) of crushed orange peel powder, adding dilute hydrochloric acid with pH=1 (dilute hydrochloric acid with pH up to 3 may also be used), controlling a solid-to-liquid mass ratio at 1:20 (a ratio of 1:10-20 may achieve the same effect), and stirring magnetically at 40 degrees Celsius (° C.) (a temperature range may be 20° C.-60° C.) for 1 hour (h) (a time range may be 0.5-1.5 h). After a reaction, cooling to room temperature, and filtering a supernatant with a cloth to obtain the RG-I pectin extract.

Taking 10 milliliters (mL) of the RG-I pectin extract, adding 4 times (3-5 times may achieve the same effect) the volume of anhydrous ethanol, performing ethanol precipitation for 2 h (1-12 h may achieve the same effect), filtering the precipitates with a cloth, washing the precipitates once with 70% ethanol, filtering again, and drying in an oven at 60° C. for 1 h, and weighing a dried product to obtain a weight of RG-I pectin. After calculation, a content of the RG-I pectin in the RG-I pectin extract is 0.5 g/100 mL.

Embodiment 2

A preparation method for the polysaccharide-pectin compound (HG Pectin Compound, HG-PC), including the following steps:

(1) dissolving 0.5 g of the HG pectin in 50 mL of deionized water, stirring magnetically at 30° C. until completely dissolved to obtain an HG pectin solution (a mass-to-volume ratio of solute to solvent in a range of 0.5-5:100 may achieve the same effect). Placing a beaker containing 100 mL of the RG-I pectin extract (prepared in Embodiment 1) on a magnetic stirrer, heating to 40° C. (30-40° C. may achieve the same effect) and maintaining the temperature, adding 50% (40-60% may achieve the same effect) of the HG pectin solution dropwise into the RG-I pectin extract while stirring continuously to achieve thorough pre-mixing, after uniform mixing, adding a remaining HG pectin solution and continuing stirring, adjusting the pH of the compound to 4 (pH 3-7 may achieve the same effect), adding 4 times (3-5 times may achieve the same effect) the volume of anhydrous ethanol to the compound, performing ethanol precipitation for 2 h (1-12 h may achieve the same effect), and filtering the precipitates with a cloth.

(2) Washing the precipitates obtained in the step (1) once with 70% ethanol, filtering again, drying in an oven at 60° C. for 1 h, and grinding the dried product to obtain an HG-PC powder.

Preparation method for the HG pectin: using citrus or other raw materials, extracting with acid with pH=1.5, (extraction temperature is above 70° C.) for more than 1 h, followed by filtering, ethanol precipitating, and drying to obtain the HG pectin.

Figure 1:
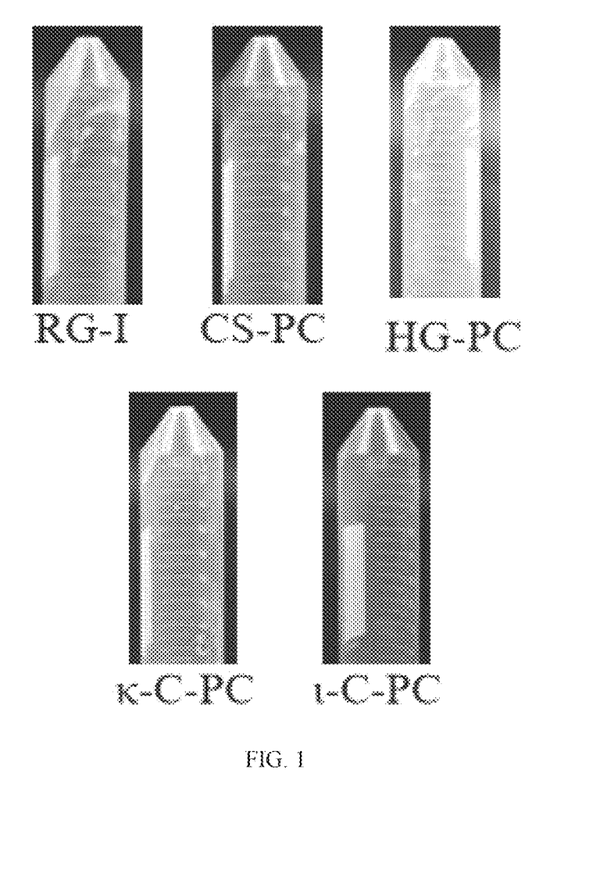
FIG. 1 is a schematic diagram of insoluble precipitates after redissolution and centrifugation of samples prepared in Embodiment 2, Embodiment 3, Embodiment 4, Comparative Example 1 and Comparative Example 2.

Compared with Comparative Example 1, the HG-PC obtained in this embodiment is fluffier (FIG. 2), and a structure of the HG-PC is looser from a microscopic perspective (FIG. 3C), improving the solubility of the RG-I pectin in the HG-PC to 54.88%, and an amount of the insoluble precipitates after centrifugation is also reduced (FIG. 1).

Embodiment 3

A preparation method for a polysaccharide-pectin compound (κ-Carrageenan Pectin Compound, κ-C-PC), including the following steps:

(1) dissolving 0.5 g of κ-carrageenan in 50 mL of deionized water, stirring magnetically at 80° C. until completely dissolved to obtain a κ-carrageenan solution (a mass-to-volume ratio of solute to solvent in the range of 0.5-5:100 may achieve the same effect). Placing a beaker containing 100 mL of the RG-I pectin extract (prepared in Embodiment 1) on a magnetic stirrer, heating to 40° C. (30-40° C. may achieve the same effect) and maintain the temperature. First, add 50% (40-60% may achieve the same effect) of the κ-carrageenan solution dropwise to the RG-I pectin extract while stirring continuously to achieve thorough pre-mixing. After uniform mixing, adding a remaining κ-carrageenan solution and continuing stirring. Adjusting the pH of the mixture to 4 (pH 3-7 may achieve the same effect), adding 4 times (3-5 times may achieve the same effect) the volume of anhydrous ethanol to the mixture, performing ethanol precipitation for 2 h (1-12 h may achieve the same effect), and filtering the precipitates with a cloth.

(2) Washing the precipitates obtained in the step (1) once with 70% ethanol, filtering again, drying in an oven at 60° C. for 1 h, and grinding the dried product to obtain the κ-C-PC powder.

Compared with Comparative Example 1, the κ-C-PC obtained in this embodiment is fluffier (FIG. 2), and the structure of the κ-C-PC is looser from a microscopic perspective (FIG. 3D), improving the solubility of the RG-I pectin in the compound to 59.07%, and the amount of insoluble precipitates after centrifugation is also reduced (FIG. 1).

Embodiment 4

A preparation method for a polysaccharide-pectin compound (ι-Carrageenan Pectin Compound, ι-C-PC), including the following steps:

(1) dissolving 0.5 g of ι-carrageenan in 50 mL of deionized water, stirring magnetically at 80° C. until completely dissolved to obtain an ι-carrageenan solution (a mass-to-volume ratio of solute to solvent in the range of 0.5-5:100 may achieve the same effect). Placing a beaker containing 100 mL of the RG-I pectin extract (prepared in Embodiment 1) on a magnetic stirrer, heating to 40° C. (30-40° C. may achieve the same effect) and maintaining the temperature, adding 50% (40-60% may achieve the same effect) of the ι-carrageenan solution dropwise to the RG-I pectin extract while stirring continuously to achieve thorough pre-mixing. After uniform mixing, adding a remaining ι-carrageenan solution and continuing stirring. Adjusting the pH of the compound to 4 (pH 3-7 may achieve the same effect), adding 4 times (3-5 times may achieve the same effect) the volume of anhydrous ethanol to the compound, performing ethanol precipitation for 2 h (1-12 h may achieve the same effect), and filtering the precipitates with a cloth.

(2) Washing the precipitates obtained in the step (1) once with 70% ethanol, filtering again, drying in an oven at 60° C. for 1 h, and grinding the dried product to obtain the ι-C-PC powder.

Compared with Embodiment 2, Embodiment 3 and Comparative Example 1, the ι-C-PC obtained in this embodiment is the fluffiest (FIG. 2), and the structure of the ι-C-PC is the loosest from a microscopic perspective (FIG. 3E), resulting in the greatest improvement in the solubility of the RG-I pectin in the compound to 87.71%, and the amount of insoluble precipitates after centrifugation is the least (FIG. 1).

Comparative Example 1

A preparation method for pure RG-I pectin, including the following steps:

(1) taking 10 g of crushed orange peel powder, adding dilute hydrochloric acid with pH=1, controlling the solid-to-liquid mass ratio at 1:20, and stirring magnetically at 40° C. for 1 h. After the reaction, cooling to room temperature, filtering the supernatant with a cloth to obtain the RG-I pectin extract. Adjusting the pH of the extract to 4, adding 4 times the volume of anhydrous ethanol, performing ethanol precipitation for 2 h, and filtering the precipitates with a cloth.

(2) Washing the precipitates once with 70% ethanol, filtering again, drying in an oven at 60° C. for 1 h, and grinding the dried product to obtain a RG-I pectin powder.

Due to thermal aggregation, the pure RG-I pectin obtained in this comparative example has poor fluffiness (FIG. 2), and the structure of the pure RG-I pectin is denser from a microscopic perspective (FIG. 3A), The solubility is poor at 33.32%, and the amount of insoluble precipitates after centrifugation is higher (FIG. 1).

Comparative Example 2

A preparation method for a polysaccharide-pectin compound (Chitosan Pectin Compound, CS-PC), including the following steps:

(1) dissolving 0.5 g of chitosan in 50 mL of acetic acid solution with pH=2, stirring magnetically at 80° C. until completely dissolved to obtain a chitosan solution. Placing a beaker containing 100 mL of the RG-I pectin extract (prepared in Embodiment 1) on a magnetic stirrer, heating to 40° C. and maintaining the temperature, adding 50% of the chitosan solution dropwise to the RG-I pectin extract while stirring continuously to achieve thorough pre-mixing. After uniform mixing, adding a remaining chitosan solution and continuing stirring. Adjusting the pH of the compound to 4, adding 4 times the volume of anhydrous ethanol, performing ethanol precipitation for 2 h, and filtering the precipitates with a cloth.

(2) Washing the precipitates obtained in the step (1) once with 70% ethanol, filtering again, drying in an oven at 60° C. for 1 h, and grinding the dried product to obtain the CS-PC powder.

Compared with Embodiment 2, Embodiment 3, Embodiment 4 and Comparative Example 1, the CS-PC obtained in this comparative example has the worst fluffiness (FIG. 2), and the structure of the CS-PC is the densest from a microscopic perspective, presenting a flat sheet-like structure (FIG. 3B), resulting in a significant decrease in the solubility of the RG-I pectin in the compound to −46.36%, and the amount of insoluble precipitates after centrifugation is the highest (FIG. 1).

Analysis of Results

Compared with Comparative Example 1 without added polysaccharides, the solubility of the RG-I pectin in Comparative Example 2 decreases sharply. Additionally, because the polysaccharides may not be completely precipitated during ethanol precipitation, an actual mass of the polysaccharides in the compound may not be calculated when determining solubility, resulting in a negative value. Embodiments 2, Embodiment 3, and Embodiment 4 use three types of negatively charged polysaccharides, all of the negatively charged polysaccharides improve the solubility of the heat-dried RG-I pectin. An improvement effect is related to a charge density of the polysaccharides, with higher charge density leading to better solubility improvement. Embodiment 4 shows the best improvement effect.

FIG. 1 is a schematic diagram of insoluble precipitates after redissolving and centrifuging 0.05 g of samples prepared in Embodiment 2, Embodiment 3, Embodiment 4, Comparative Example 1 and Comparative Example 2 and in 10 mL of water with 5 min of shaking, where the precipitates remaining at a bottom of tubes are insoluble precipitates, and statistical results are detailed in Table 1. The precipitates in Comparative Example 1 and Comparative Example 2 are larger than the precipitates in Embodiment 2, Embodiment 3, and Embodiment 4, and the amount of precipitates decreases as solubility increases. Embodiment 4 has the least amount of precipitates.

TABLE 1

Insoluble precipitates after redissolution and centrifugation of samples prepared in Embodiment 2, Embodiment 3, Embodiment 4, Comparative Example 1 and Comparative Example 2

| Samples | Mass of insoluble precipitates after redissolution and centrifugation (g) |
|---|---|
| RG-I | 0.03 |
| CS-PC | 0.018 |
| HG-PC | 0.018 |
| κ-C-PC | 0.015 |
| ι-C-PC | 0.003 |

Figure 2:
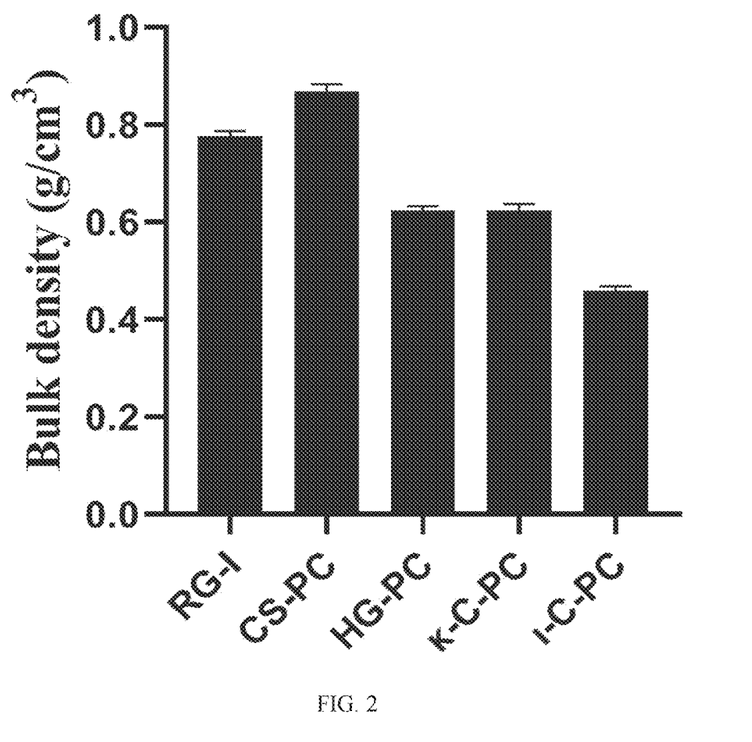
FIG. 2 is a bar chart of bulk density data of samples prepared in Embodiment 2, Embodiment 3, Embodiment 4, Comparative Example 1 and Comparative Example 2.

FIG. 2 is a bar chart of bulk density data for samples prepared in Embodiment 2, Embodiment 3, Embodiment 4, Comparative Example 1 and Comparative Example 2. As shown in FIG. 2, the bulk density decreases in an order of Comparative Example 2, Comparative Example 1, Embodiment 2, Embodiment 3, and Embodiment 4. Comparative Example 2 has the highest bulk density, while Embodiment 4 has the lowest. As a macroscopic indicator, bulk density reflects a fluffy degree of a sample powder and may, to some extent, indicate a degree of aggregation of the sample from a microscopic perspective. The higher the bulk density, the poorer the sample bulkiness and the stronger aggregation, so the sample aggregation in Comparative Example 2 has the strongest aggregation, while the sample aggregation in Embodiment 4 has the weakest aggregation, consistent with a solubility data.

Figure 3A:
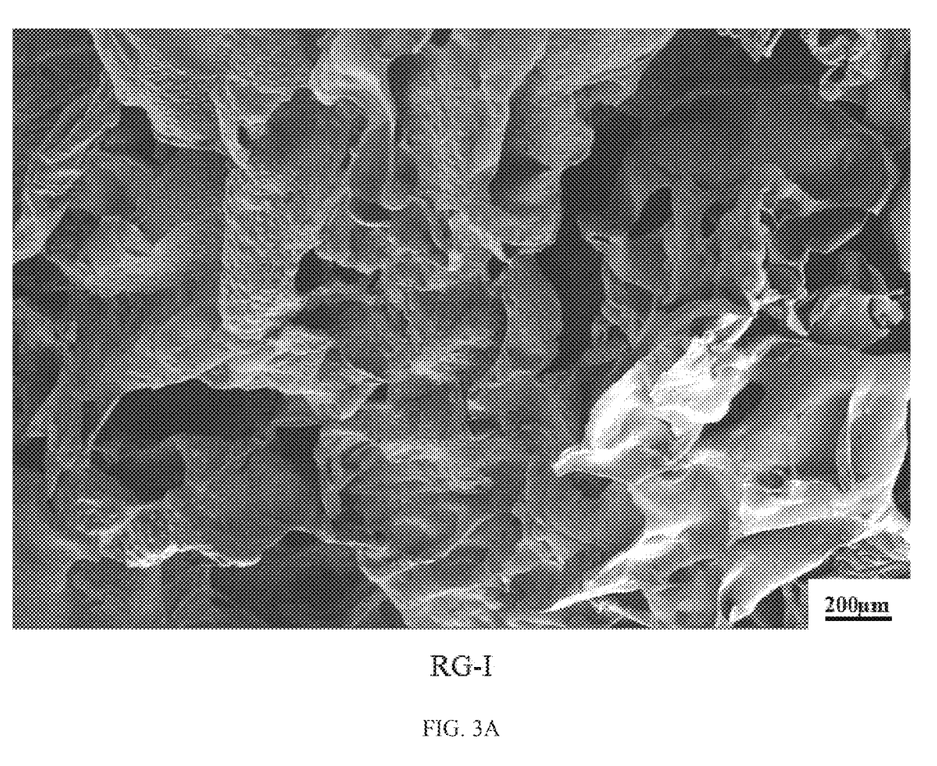
FIG. 3A is a micrograph of RG-I samples prepared in Comparative Example 1.
Figure 3B:
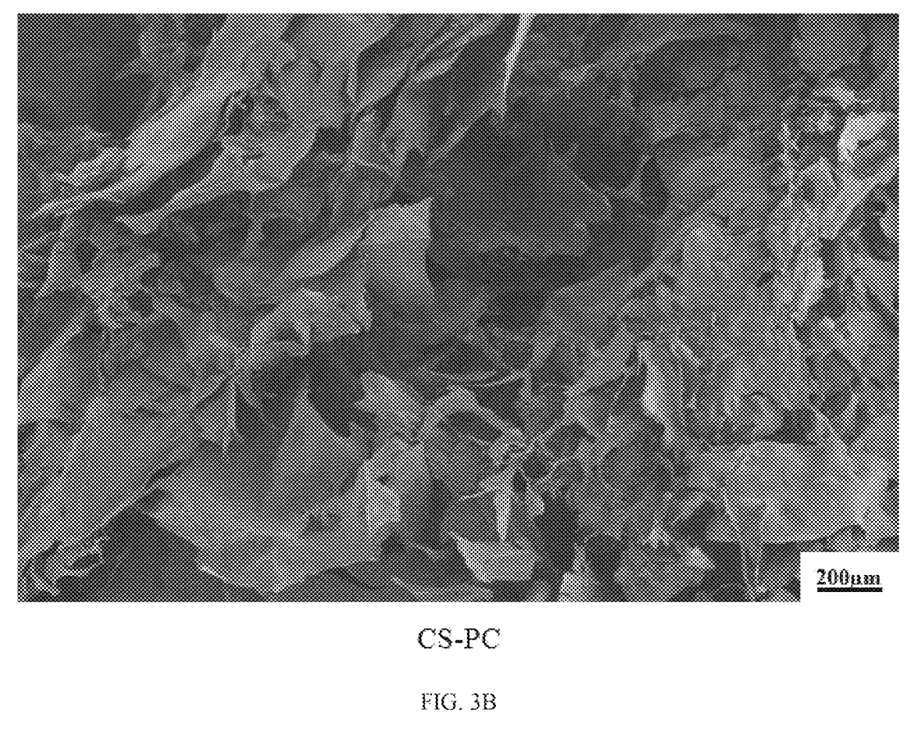
FIG. 3B is a micrograph of CS-Pectin Compound (PC) samples prepared in Comparative Example 2.
Figure 3C:
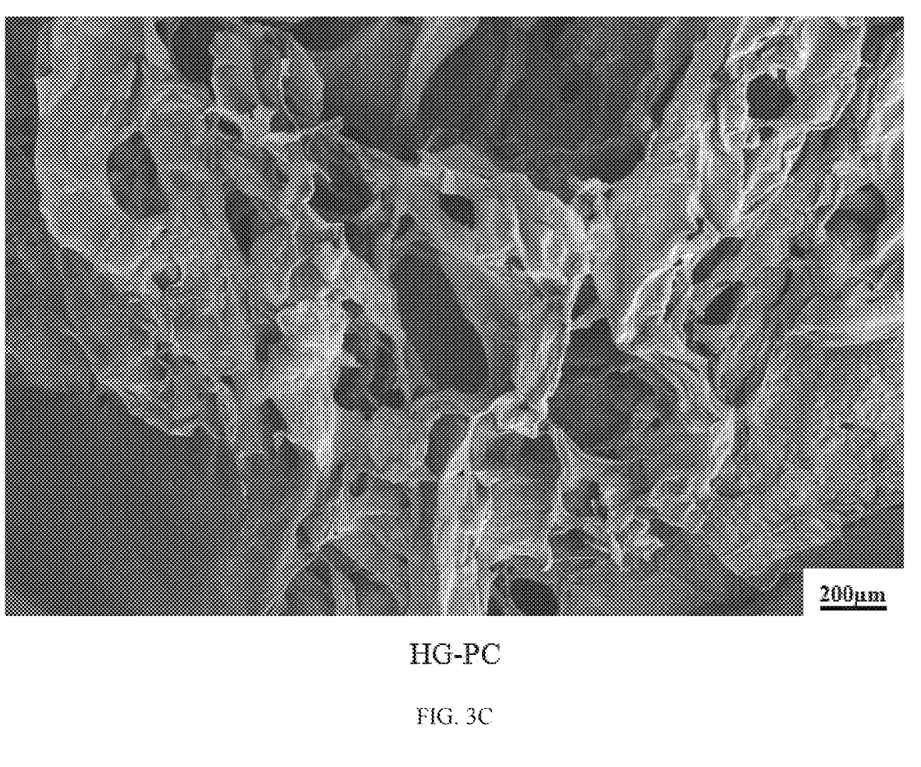
FIG. 3C is a micrograph of HG-PC samples prepared in Embodiment 2.
Figure 3D:
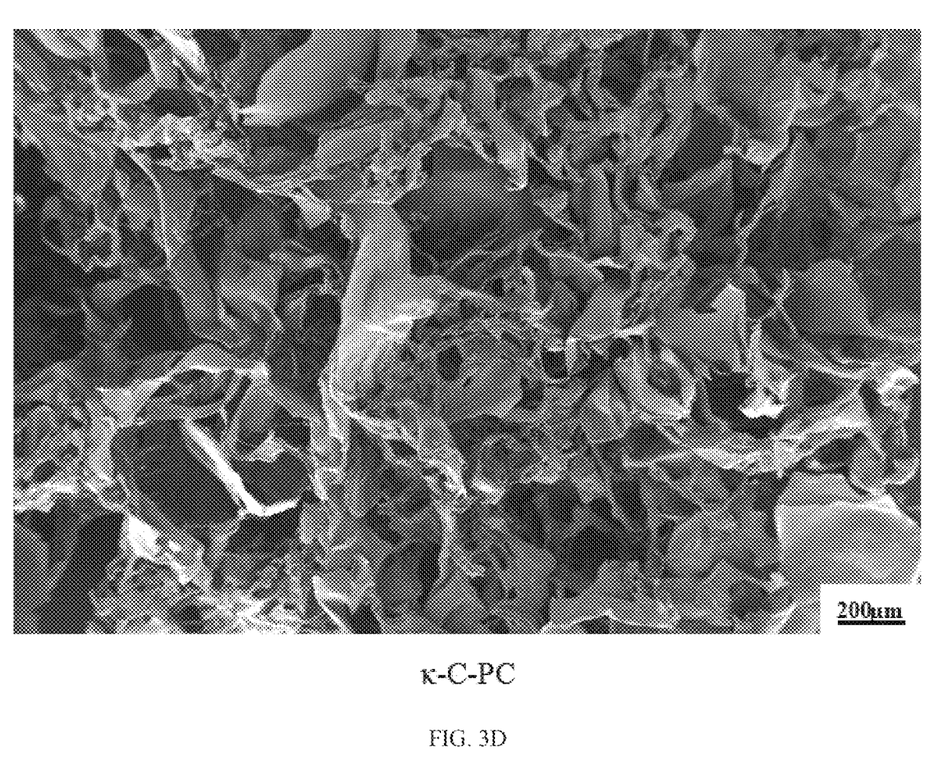
FIG. 3D is a micrograph of κ-C-PC samples prepared in Embodiment 3.
Figure 3E:
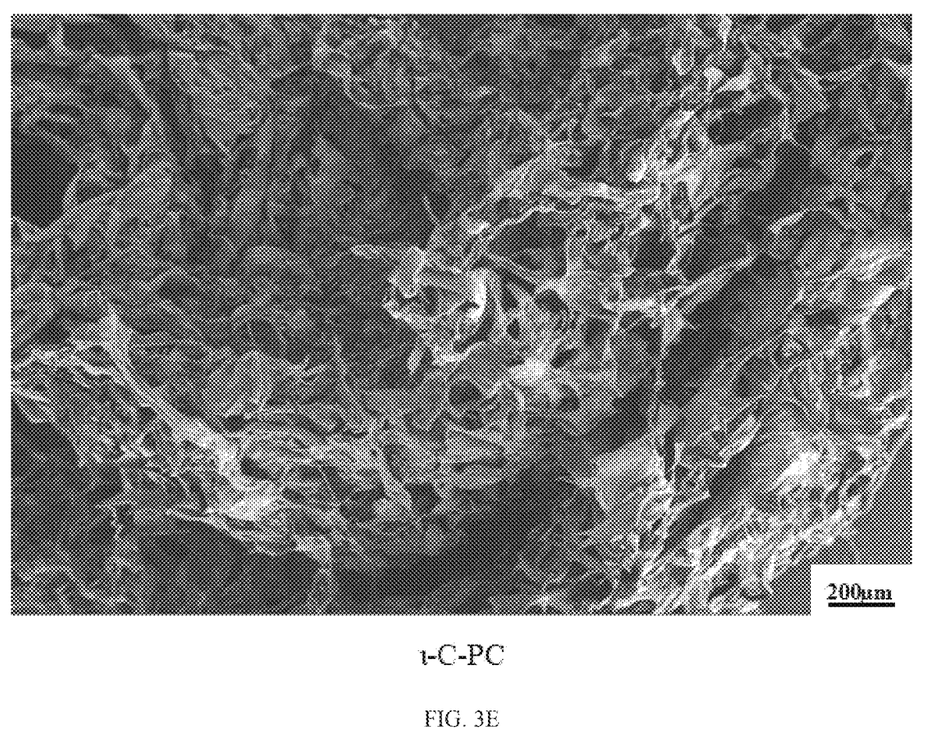
FIG. 3E is a micrograph of ι-C-PC samples prepared in Embodiment 4.

FIG. 3A is a micrograph of RG-I samples prepared in Comparative Example 1; FIG. 3B is a micrograph of CS-PC samples prepared in Comparative Example 2; FIG. 3C is a micrograph of HG-PC samples prepared in Embodiment 2; FIG. 3D is a micrograph of κ-C-PC samples prepared in Embodiment 3; FIG. 3E is a micrograph of ι-C-PC samples prepared in Embodiment 4. As shown in FIG. 3A, FIG. 3B, FIG. 3C, FIG. 3D, and FIG. 3E, Comparative Example 1 has an uneven ribbon-like structure with many irregular spaces inside. In Comparative Example 2, due to electrostatic attraction between the RG-I pectin and chitosan, CS-PC presents a flat sheet-like structure. This reduces the dissolution contact area between CS-PC and molecules, resulting in poorer solubility compared to RG-I pectin. In Embodiments 2, Embodiment 3, Embodiment 4, negatively charged polysaccharides enable the polysaccharide-pectin compound to form a porous network structure with varying pore sizes. Compared with Embodiment 2 and Embodiment 3, Embodiment 4 has smaller pores and higher pore density, likely due to the higher charge density of ι-carrageenan, which provides stronger electrostatic repulsion. Additionally, the microscopic structures of the different samples are consistent with the conclusions drawn from solubility and bulk density.

The above-described embodiments are merely illustrative of preferred implementations of the disclosure and do not limit to the scope of the disclosure. Without departing from a design spirit of the disclosure, various modifications and improvements made by those skilled in the art to the technical schemes of the disclosure shall fall within the protection scope defined by claims of the disclosure.

What is claimed is:

1. A method for promoting a solubility of rhamnogalacturonan I (RG-I) pectin based on polysaccharide interaction, wherein the method comprises following steps:
   adding an aqueous solution of negatively charged polysaccharides into an RG-I pectin extract, mixing uniformly, adjusting pH of a compound to 3-7, and then performing ethanol precipitation to obtain a precipitate;
   washing the precipitate, followed by drying and crushing to obtain a polysaccharide-pectin compound; and
   wherein the RG-I pectin extract is obtained by extracting orange peel powder with dilute hydrochloric acid.

2. The method for promoting the solubility of the RG-I pectin according to claim 1, wherein a pH of the dilute hydrochloric acid is 1-3.

3. The method for promoting the solubility of the RG-I pectin according to claim 1, wherein a mass ratio of the RG-I pectin in the RG-I pectin extract to the negatively charged polysaccharides is 1:1.

4. The method for promoting the solubility of the RG-I pectin according to claim 1, wherein the negatively charged polysaccharides are homogalacturonan (HG) pectin, κ-carrageenan, or ι-carrageenan.

5. The method for promoting the solubility of the RG-I pectin according to claim 1, wherein the negatively charged polysaccharides are ι-carrageenan.

6. The method for promoting the solubility of the RG-I pectin according to claim 1, wherein a mass ratio of the orange peel powder to the dilute hydrochloric acid is 1:10-20.

7. The method for promoting the solubility of the RG-I pectin according to claim 1, wherein in the aqueous solution of the negatively charged polysaccharides, a mass-to-volume ratio of solute to solvent is (0.5-5) g:100 mL.

8. The method for promoting the solubility of the RG-I pectin according to claim 1, wherein the step of adding the aqueous solution of the negatively charged polysaccharides into the RG-I pectin extract comprises: first adding 40-60% of the aqueous solution of the negatively charged polysaccharides dropwise to the RG-I pectin extract while stirring continuously to achieve pre-mixing, and after uniform mixing, adding a remaining portion of the aqueous solution of the negatively charged polysaccharides and stirring uniformly.

9. The method for promoting the solubility of the RG-I pectin according to claim 1, wherein the ethanol precipitation is performed using anhydrous ethanol, and a volume of the anhydrous ethanol added is 3-5 times of a volume of the compound.

10. A polysaccharide-pectin compound prepared by the method according to claim 1.

\* \* \* \* \*